United States Patent [19]
Bergamini

[11] Patent Number: 5,464,039
[45] Date of Patent: Nov. 7, 1995

[54] FLUID FLOWMETER-CONTROLLER

[75] Inventor: Giorgio Bergamini, Bari, Italy

[73] Assignee: Nuovopignone - Industrie Meccaniche E Fonderia S.p.A., Florence, Italy

[21] Appl. No.: 230,203

[22] Filed: Apr. 20, 1994

[30] Foreign Application Priority Data

Apr. 27, 1993 [IT] Italy ................ MI93A0818

[51] Int. Cl.⁶ .............. F16K 37/00; G01F 1/66
[52] U.S. Cl. ............. 137/551; 251/123; 251/129.11; 73/861.29
[58] Field of Search ............ 137/551; 251/123, 251/127, 129.11, 129.12; 73/861.29, 861.27

[56] References Cited

U.S. PATENT DOCUMENTS

| | | | |
|---|---|---|---|
| 3,678,731 | 7/1972 | Wells et al. | 73/861.29 |
| 3,901,078 | 8/1975 | McShane | 73/861.29 X |
| 4,078,428 | 3/1978 | Baker et al. | 73/861.31 |
| 4,102,186 | 7/1978 | Brown | 73/861.27 |
| 4,635,678 | 1/1987 | Peterman et al. | 137/551 |
| 5,035,147 | 7/1991 | Woodward | 73/861.29 X |

FOREIGN PATENT DOCUMENTS

| | | |
|---|---|---|
| 0347096 | 12/1989 | European Pat. Off. |
| 0479434 | 4/1992 | European Pat. Off. |
| 2357869 | 2/1978 | France |
| 2527306 | 2/1976 | Germany |
| 9205130 | 7/1992 | Germany |

OTHER PUBLICATIONS

Ingenieurs de l'automobile, No. 2, Feb. 1980, pp. 21–25, R. Dell'Acqua, et al., "Problemes De Realisation D'Un Debitmetre Massique D'Air Pour Systemes Electroniques D'Alimentation".

*Primary Examiner*—John Rivell
*Attorney, Agent, or Firm*—Oblon, Spivak, McClelland, Maier & Neustadt

[57] ABSTRACT

A flowmeter controller, which includes emitter sensor pairs coaxial to a rectilinear measurement tube which has a cross-section uniformly decreasing from its inlet, this latter being of annular radial extension symmetrical about the tube axis, and being provided with a grid of annular structure offering resistance to passage of the fluid under examination which increases from the outer end to the inner end of the grid, and being connected to the tube by an annular inlet duct which is curved in the shape of a circular arc with a uniformly decreasing cross-section and including a deflection fairing an axial flow deflector is provided at the tube outlet to convey the fluid into an annular duct of decreasing cross-section and the radial exit port is closable by a valving member moved along the measurement tube axis by an operating member.

7 Claims, 2 Drawing Sheets

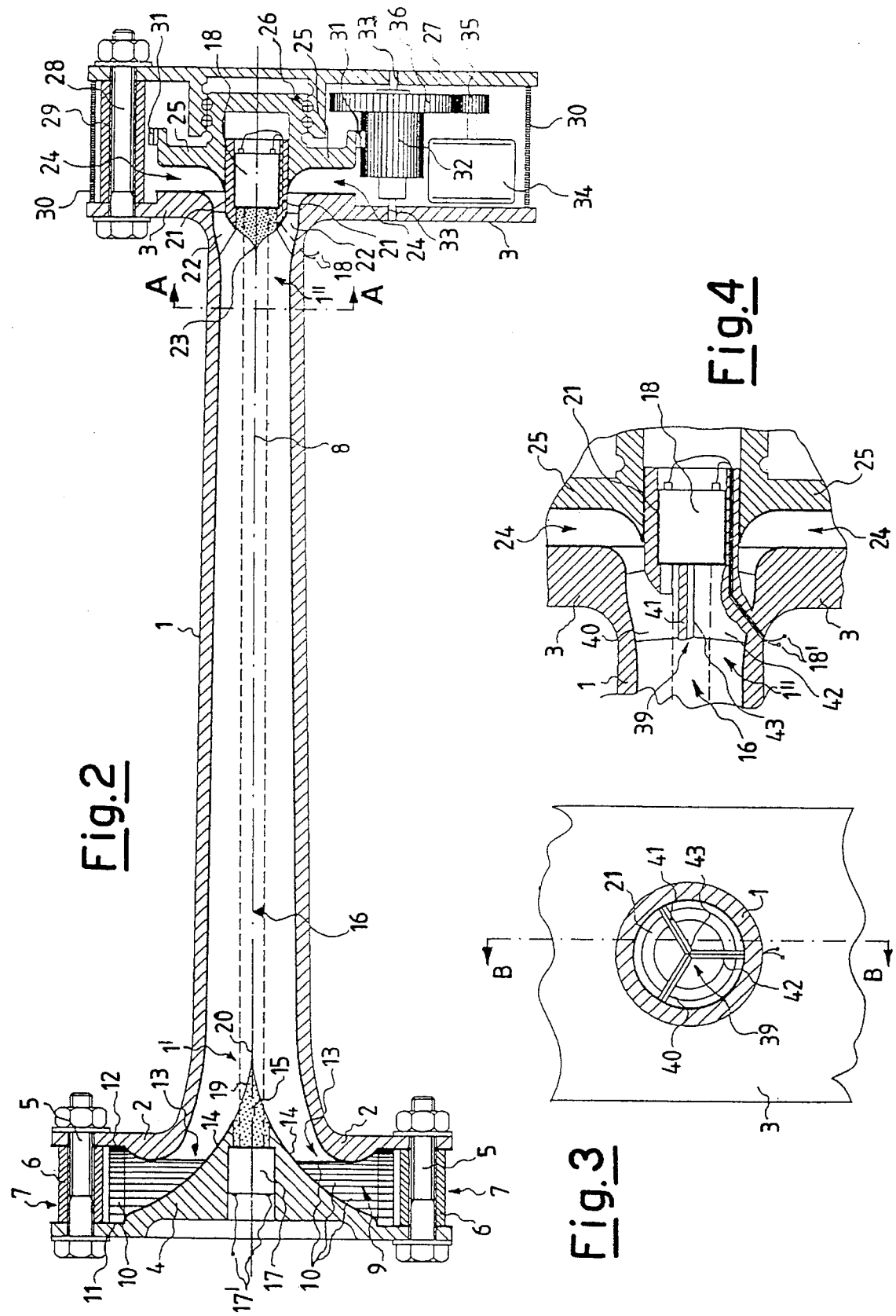

FLUID FLOWMETER-CONTROLLER

BACKGROUND OF THE INVENTION

1. Field of the Invention

This invention relates to a new type of meter which, by using ultrasound and adopting suitable expedients associated with a particular geometry of the measurement tube, ensures under all conditions a constantly laminar flow with a parabolic fluid velocity distribution within said tube to hence enable the emitter-sensor pairs for the ultrasonic beam to be positioned aligned along the tube axis where the signals are least disturbed and of greatest intensity, and in addition allows not only an economical and highly precise measurement of the flow rate of any fluid to be achieved but also allows said flow rate to be easily and precisely controlled and the flow to be instantaneously shut off, as will without doubt for safety reasons be required of a later generation of gas meters for domestic and in particular industrial use.

2. Discussion of the Background

In the present state of the art, for such gas meters mechanical systems are used which operate by displacement of gas volumes within one or more chambers of a bellows type and hence are of variable geometry, by means of a rotary distributor or reciprocating slide valves, the flow rate being proportional to the volumetric displacement of said chambers.

Such known meters have however the drawbacks of a mechanically complex and hence costly structure, plus moving parts such that the inevitable wear and soiling thereof can prejudice measurement accuracy. Again, their exquisitely mechanical nature makes them particularly unsuitable for development as an "intelligent" meter without further costly constructional complications. From the state of the art there are also known various types of systems for measuring the flow of gas and fluids in general based on the ultrasound principle, ie determining the variations in the time taken by ultrasonic beams to pass from emitters to sensors or receivers variously positioned relative to the axis of the measurement tube.

Although said ultrasound principle is intrinsically insensitive to dirt and suitable for "intelligent" development of the relative measurement system, it has however the serious drawback of being strongly influenced by the type of motion of the fluid within the tube, and this in particular along the tube axis, so that each time there is a discontinuity in the fluid motion in the sense of passing from laminar to turbulent flow, the flow measurement is affected by an error emitting from the change in the fluid velocity distribution from a parabolic to a flat profile. Again, the presence of a flow which can be randomly laminar or turbulent always creates considerable problems of measurement precision and instability, in addition to the fact that by generating vortices, turbulence introduces without doubt a further disturbance in the ultrasound movement.

To obviate said turbulence drawbacks said known ultrasound measurement systems use various expedients such as not orientating the ultrasonic beam in the direction of the tube axis, this being the region in which greatest velocity change occurs in passing from the laminar to the turbulent regime, even though it is precisely in this region in the case of laminar flow that the measurement can be made under the best possible exactness and precision conditions in that the emitted signal reaches the sensor practically undeformed or with minimum distortion, this orientation instead being offset from said axis by slightly more than one half the tube radius, to operate in regions in which the flow velocity is approximately equal for both laminar and turbulent flow (see in this respect U.S. Pat. No. 4,078,428 of the National Research Development Co. and U.S. Pat. No. 4,102,186 of E. I. Du Pont de Nemours & Co.).

However, with these offset measurements the threads of the ultrasonic beam travel at different speeds to reach the sensor at different times, to hence distort the transmitted signals and require the use of complicated and costly handling of said signals together with a multiplicity of measurements to achieve an average approximating to the correct flow value.

Hence, all known ultrasonic fluid flow measurement systems have limits due to high cost because of the need for a multiplicity of emitters and sensors, the burden and high energy consumption involved in the complicated processing of data to achieve a measurement substantially independent of the law of fluid motion, and the inconvenience of an approximate measurement obtained as the average of several measurements.

SUMMARY OF THE INVENTION

The object of the present invention is to obviate said drawbacks by providing a meter which by ensuring constantly laminar motion with a parabolic profile for the fluid within the measurement tube enables precise, reliable and repeatable flow measurements to be made using only two pairs of ultrasound emitters-sensors arranged along the axial direction of said tube, together with precise flow control to the extent of its total shutoff.

This is substantially attained by virtue of the fact that it has been experimentally found that a fluid always preserves its state of laminar motion within a measurement tube, without ever passing to turbulent motion, if said tube is rectilinear and if said fluid is maintained under continuous acceleration within said measurement tube. For this purpose it is sufficient to make the measurement tube rectilinear and of uniformly decreasing cross-section starting from an inlet section in which the motion is reliably laminar, this being substantially achieved by making said inlet section sufficiently large to ensure laminar motion even at the maximum predicted flow rate, and by providing an antiturbulence grid the purpose of which is to create a pressure drop on its entry into said measurement tube and hence reduce velocity pulsations generated by turbulence external to the tube to hence achieve a uniform fluid velocity at each point of the grid.

However said two pairs of ultrasound emitters-sensors now have to be installed coaxial to the rectilinear measurement tube, and hence in order to prevent their presence triggering turbulence in the tube and hence altering the measurement, a tube inlet of annular radial extension symmetrical about the axis of said tube is used, this inlet, provided with an antidisturbance grid of annular structure, being connected to an annular inlet duct which is curved in the shape of a circular arc, is also of decreasing cross-section to maintain the fluid under acceleration in order to ensure laminar motion also within the curved portion, and comprises, facing the inlet emitter-sensor pair, a fairing of substantially conical extension obtained by revolution of a circular arc having its front end tangential to the tube axis. In this manner a structure symmetrical about the measurement tube axis is obtained which by allowing the flow direction to change from radial to axial without introducing into the fluid motion any asymmetric velocity component which would inevitably cause turbulence, ensures that the fluid motion is only laminar. Again, in order to allow the ultrasonic beam of the inlet emitter to penetrate into the measurement tube, said fairing of said duct is formed of transparent material with a minimum refraction coefficient for the ultrasonic beam.

Finally, to prevent turbulence arising at the outlet of the measurement tube due to the axial presence of the outlet emitter-sensor pair and the possible presence of the control and/or shutoff member for the outlet fluid flow being able to disturb the laminar motion of the fluid within the tube, said outlet of the rectilinear measurement tube is formed with a transparent axial flow deflector of minimum refraction coefficient for the ultrasonic beam, which is positioned coaxial to the front of the outlet emitter-sensor pair conveys said flow into an annular outlet duct having a decreasing cross-section to maintain the fluid always under acceleration so as to ensure maintenance of its laminar flow, and having an annular radial exit port. said exit port can be constricted until total closure by a valving member movable along the measurement tube axis above a cylindrical portion of said deflector, and is shaped such that whatever its position it maintains the cross-section of said outlet duct always decreasing, hence maintaining laminar fluid motion.

It has however been experimentally found that such a flowmeter-controller presents at its inlet a flat velocity profile characteristic of turbulent motion, even if the fluid motion is perfectly laminar, and assumes a stable parabolic pattern characteristic of laminar motion gradually and only after a certain distance along the tube dependent on the Reynolds number. Hence in order to obviate this discrepancy which represents an obvious source of disturbance to the correctness of the measurement to be made, said antidisturbance grid at the meter-controller inlet is formed in such a manner as to impose a stable parabolic velocity distribution immediately at said inlet, i.e. is structured with a fluid passage resistance increasing from one end to the other in accordance with an appropriate experimentally defined relationship.

More specifically, according to a preferred embodiment said grid consists of a series of identical small-thickness rings axially facing each other at distances apart which decrease from the outer end to the inner end of the grid. In this manner the fluid velocity is greatest where the distance between the rings is greatest and hence the resistance to passage is smallest, this occurring precisely in the central region of the measurement tube, and decreases as said distance decreases, to a minimum at the inner end of the grid corresponding to the wall of the measurement tube.

Hence the fluid flowmeter-controller, comprising a rectilinear measurement tube having an inlet and an outlet for the fluid under examination and, corresponding with these, at least one pair of ultrasonic beam emitters cooperating with at least one corresponding pair of sensors or receivers to determine the time taken for said beam to pass from the emitters to the sensors both in the flow direction and in the opposite direction, is characterised according to the present invention in that said pairs of ultrasonic emitters-sensors are installed coaxial to the rectilinear measurement tube, which has a cross-section uniformly decreasing from said inlet, this latter being of annular radial extension symmetrical about said measurement tube axis, and being provided with a grid of annular structure offering a resistance to passage of the fluid under examination which increases from the outer end to the inner end of the grid, and being connected to the measurement tube by an annular inlet duct which is curved in the shape of a circular arc with a uniformly decreasing cross-section and comprises, facing the inlet emitter-sensor pair, an inlet deflection fairing of substantially conical extension, an axial flow deflector also being provided to the front of and coaxial to the outlet emitter-sensor pair to convey the fluid into an annular outlet duct of decreasing cross-section, of which the exit port, of annular radial extension, can be constricted until total closure by a valving member movable along the measurement tube axis by operating means.

According to a preferred embodiment of the present invention, said grid of annular structure consists of a series of identical small-thickness rings axially facing each other at distances apart which decrease from the outer end to the inner end of the grid. According to a further preferred embodiment of the present invention, said inlet deflection fairing consists of a body of transparent material with minimum refraction coefficient for said ultrasonic beam, and of substantially conical extension obtained as the revolution of a circular arc having one end tangential to the measurement tube axis.

Said axial flow deflector consists according to the invention of a body of substantially conical extension formed of transparent material of minimum refraction coefficient for said ultrasonic beam, and supported by a hollow cylindrical portion which guides said valving member and is fixed to the measurement tube by support lugs.

According to a further preferred embodiment of the present invention, said means for moving the valving member along the measurement tube axis consist of an electric motor operating by way of a train of reduction gears a pinion arranged parallel to said tube axis and engaging a gearwheel rigid with the valving member which, slidable axially on said hollow cylindrical portion of said deflector, is fixed to a ball recirculation screw supported by a container rigidly fixed to said tube, said pinion being of such a length as to ensure said engagement during the entire rotational and translational travel of the valving member until complete closure of said exit port.

In this manner, each rotation of the pinion in one or the other direction by the motor results in a rotation of the valving member, which is converted into its axial translation by said ball recirculation screw.

Finally, to obviate possible problems deriving from imperfect transparency of said inlet deflection fairing towards said ultrasonic beam, according to a modification of the present invention, said fairing is dispensed with, and to prevent the creation of turbulent vortices consequent on the removal of said fairing, the expedient is adopted of creating, by means of a small deflector ring projecting outwards from the original outline of said fairing, a local fluid acceleration such as to stabilize the generation of a stationary vortex occupying the space made available by removing said fairing.

For the same reason, said transparent axial outlet flow deflector of substantially conical extension situated in front of the outlet emitter-sensor pair is replaced by a stabilization arrangement consisting of three fins having a common axial side and arranged radially at 120° apart, which are fixed to the measurement tube to support the hollow cylindrical guide portion for the valving member. In this respect, by removing the deflector there is created substantially in front of the outlet emitter-sensor pair a cavity subjected to the fluid stagnation pressure which by causing said fluid to pass from one side of the cavity to the other can trigger oscillatory motion which, propagating along the measurement tube, can disturb the flow laminarity and hence the measurement. The fins of the device serve precisely to prevent said oscillations.

The invention is further described hereinafter with reference to the accompanying drawings, which illustrate preferred embodiments thereof by way of non-limiting example in that technical, technological or constructional modifications can be made thereto without departing the scope of the present invention. For example, instead of consisting of a series of rings suitably spaced apart, said grid of annular structure can consist of a series of through tubes the diameters of which decrease from the outer end to the inner end of the grid, or a laser beam can be used instead of an ultrasonic beam.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2 is a longitudinal section through the meter-controller of FIG. 1 drawn on a different scale;

FIG. 3 is a cross-section taken along line AA of FIG. 2 through a modification of the invention, drawn on a greater scale;

FIG. 4 is a longitudinal section taken along line BB of FIG. 3;

DESCRIPTION OF THE PREFERRED EMBODIMENT

Figure 5:
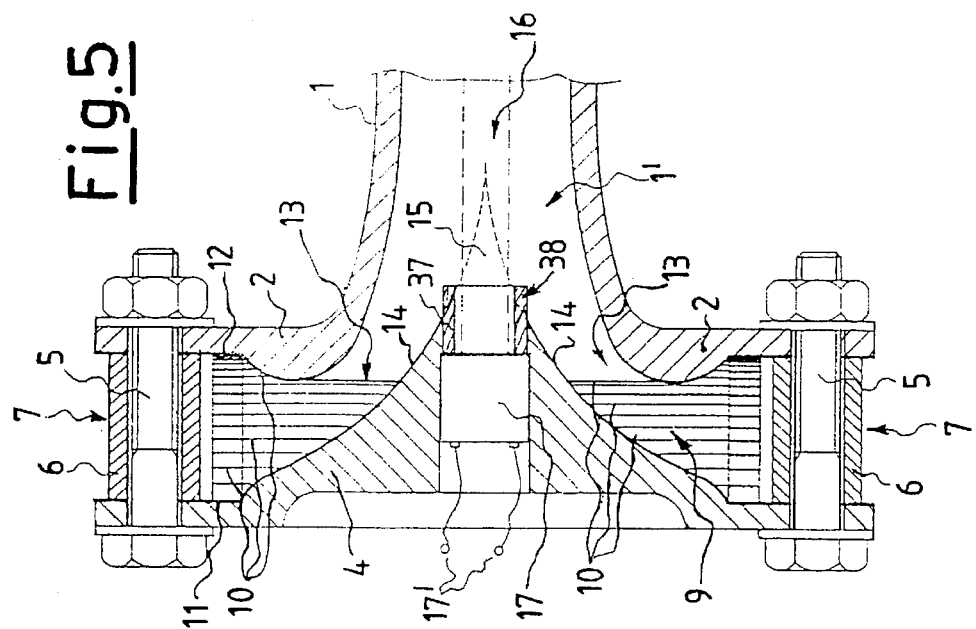
FIG. 5 is an enlarged longitudinal section taken through a portion of FIG. 2 in accordance with a modification of the invention.
Figure 1:
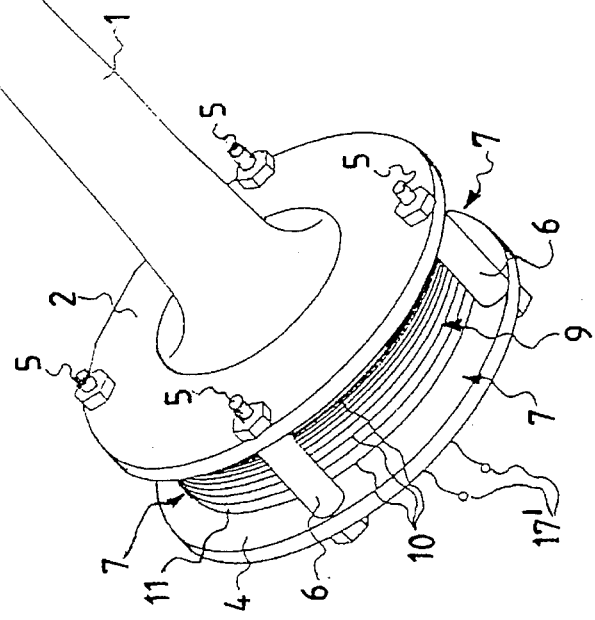
FIG. 1 is a perspective view of a fluid flowmeter-controller according to the invention.

In the figures, reference numeral 1 indicates the rectilinear measurement tube of the fluid flowmeter-controller, which has a cross-section decreasing from its inlet 1' to its outlet 1", at which there are provided annular flanges 2 and 3 respectively. The flange 2 and the closure piece 4, fixed to the latter by bolts 5 and spacers 6, together define the annular and radial inlet 7 of the meter-controller, this inlet extending symmetrically about the axis 8 of the tube 1 (see specifically FIG. 2). Said inlet 7 is provided with a grid 9 of annular structure consisting of a series of identical small-thickness rings 10 axially facing each other at distances spaced apart which decrease from the outer end 11 to the inner end 12 of the grid (see specifically FIG. 5) so as to provide a flow passage resistance which increases from the end 11 to the end 12. The inlet 7 is radius-joined to the tube 1 via an annular inlet duct 13 curved in the shape of a circular arc 14 and of uniformly decreasing cross-section (see FIG. 5) and an inlet deflection fairing 15 consisting of a transparent body of a minimum refraction coefficient for the ultrasonic beam 16, lying between two dashed lines on the figure which extend between two emitter-sensor pairs, namely an inlet pair 17 and an outlet pair 18, which are installed coaxially to the measurement tube 1 and are energized via the cables 17' and 18'. Said fairing 15 is of substantially conical extension, achieved by revolving about the axis 8 of the tube 1 a circular arc 19 having its end 20 tangential to said axis 8.

Said outlet emitter-sensor pair 18 is supported at the outlet 1" of the measurement tube 1 by a hollow cylindrical portion 21 fixed to the tube 1 by support lugs 22. To the front of said portion 21 there is mounted an axial flow deflector 23 for conveying the flow into an annular outlet duct 24 of decreasing cross-section, defined by said annular flange 3 and a valving member 25 rotatable and translatable on said cylindrical portion 21. Said axial deflector 23 consists of a substantially conical body constructed of transparent material with a minimum refraction coefficient for said ultrasonic beam 16, said valving member 25 being fixed to a ball recirculation screw 26 supported by a plate 27 connected by bolts 28 and spacers 29 to said flange 3 to form a fixed container protected by the mesh 30. The valving member 25 is also provided with a gearwheel 31 engaging a pinion 32 which is supported parallel to the axis 8 of the tube 1 by the shaft 33 and is rotated by an electric motor 34 via reduction gears 35 and 36, said pinion 32 being of sufficient length to maintain engagement with said gearwheel 31 for the entire rotational and translational travel of the valving member required for complete closure of the port of said annular outlet duct 24, In the modification of FIG. 5, said inlet deflection fairing 15 (shown by dashed lines in the figure) is replaced by a small deflector ring 37 projecting outward at 38 beyond the original contour of said fairing 15.

Finally, in FIGS. 3 and 4, said outlet axial flow deflector 23 is replaced by a stabilization device 39 consisting of three fins 40, 41 and 42 having a common axial side 43 and which, arranged 120° apart and fixed to the measurement tube 1, support said hollow cylindrical portion 21.

I claim:

1. A fluid flowmeter-controller, which comprises;.

a rectilinear measurement tube having an inlet and an outlet for the fluid under examination and at least one pair of ultrasonic beam emitters cooperating with at least one corresponding pair of sensors or receivers to determine the time taken for said beam to pass from the emitters to the sensors both in the flow direction and in the opposite direction;

said pair of ultrasonic emitters-sensors being installed coaxially with the rectilinear measurement tube and said tube having a cross-section uniformly decreasing from said inlet, said inlet forming an annular radial extension symmetrical about said measurement tube axis;

a grid of annular structures resisting passage of the fluid under examination which increases from an outer end to an inner end of the grid, and being connected to the measurement tube by an annular inlet duct which forms a circular arc with a uniformly decreasing cross-section and includes a deflector ring facing the inlet emitter-sensor pair;

a valving member; and an axial flow deflector provided in front of and coaxial with the outlet emitter-sensor pair, said flow detector conveying the fluid into an annular duct of decreasing cross-section, of which an exit port, of annular radial extension, constricted until total closure by said valving member.

2. A fluid flowmeter-controller as claimed in claim 1, wherein said grid of annular structure comprise a series of identical small-thickness rings axially facing each other and spread apart by distances which decrease from the outer end to the inner end of the grid.

3. A fluid flowmeter-controller as claimed in claim 1, wherein said inlet deflection fairing comprises a body of transparent material with a minimum refraction coefficient for said ultrasonic beam, and a substantially conical extension obtained as the revolution of a circular arc having one end tangential to the measurement tube axis.

4. A fluid flowmeter-controller as claimed in claim 1, wherein said axial flow deflector includes a body of substantially conical extension formed of transparent material of minimum refraction coefficient for said ultrasonic beam, and a hollow cylindrical portion supporting said flow detector, said hollow cylindrical portion guiding said valving member and being fixed to the measurement tube by support lugs.

5. A fluid flowmeter-controller as claimed in claim 1, which comprises a mechanism moving the valving member along the measurement tube axis and which includes an electric motor, a train of reduction gears, a pinion arranged parallel to said tube axis and a gearwheel engaging said pinion, said gearwheel being connected with the valving member, said valving member being slidable axially on said hollow cylindrical portion of said deflector and being fixed to a ball recirculation screw supported by a container rigidly fixed to said tube, said pinion being of such a length as to ensure said engagement during the entire rotational and translational travel of the valving member until complete closure of said exit port.

6. A fluid flowmeter-controller, which comprises;

a rectilinear measurement tube having an inlet and an outlet for the fluid under examination and at least one pair of ultrasonic beam emitters cooperating with at least one corresponding pair of sensors or receivers to determine the time taken for said beam to pass from the emitters to the sensors both in the flow direction and in the opposite direction;

said pair of ultrasonic emitters-sensors being installed coaxially with the rectilinear measurement tube and said tube having a cross-section uniformly decreasing from said inlet, said inlet forming an annular radial extension symmetrical about said measurement tube axis;

a grid of annular structures resisting passage of the fluid under examination which increases from an outer end to an inner end of the grid, and being connected to the measurement tube by an annular inlet duct which forms a circular arc with a uniformly decreasing cross-section and includes a deflector ring facing the inlet emitter-sensor pair and projecting outwards;

a valving member; and an axial flow deflector provided in front of and coaxial with the outlet emitter-sensor pair, said flow detector conveying the fluid into an annular duct of decreasing cross-section, of which an exit port, of annular radial extension, is constricted until total closure by said valving member.

7. A fluid flowmeter-controller, which comprises;.

a rectilinear measurement tube having an inlet and an outlet for the fluid under examination and at least one pair of ultrasonic beam emitters cooperating with at least one corresponding pair of sensors or receivers to determine the time taken for said beam to pass from the emitters to the sensors both in the flow direction and in the opposite direction; said pair of ultrasonic emitters-sensors being installed coaxial to the rectilinear measurement tube and said tube having a cross-section uniformly decreasing from said inlet, said inlet forming an annular radial extension symmetrical about said measurement tube axis;

a grid of annular structures resisting passage of the fluid under examination which increases from an outer end to an inner end of the grid, and being connected to the measurement tube by an annular inlet duct which forms a circular arc with a uniformly decreasing cross-section and includes, facing the inlet emitter-sensor, a stabilizing device which comprises three fins having a common axial side and arranged radially 120° apart which are fixed to the measurement tube to support the hollow cylindrical guide portion for the valving member;

a valving member; and an axial flow deflector provided in front of and coaxial with the outlet emitter-sensor pair, said flow detector conveying the fluid into an annular duct of decreasing cross-section, of which an exit port, of annular radial extension, is constricted until total closure by said valving member.

* * * * *